United States Patent
Bachmann et al.

[11] Patent Number: 6,085,188
[45] Date of Patent: Jul. 4, 2000

[54] METHOD OF HIERARCHICAL LDAP SEARCHING WITH RELATIONAL TABLES

[75] Inventors: David W. Bachmann, Leander; Cynthia Fleming Corn, Austin; Larry George Fichtner, Austin; Rodolfo Augusto Mancisidor, Austin; Shaw-Ben Shi, Austin, all of Tex.

[73] Assignee: International Business Machines Corporation, Armonk, N.Y.

[21] Appl. No.: 09/050,503

[22] Filed: Mar. 30, 1998

[51] Int. Cl.[7] .................................................. G06F 17/30
[52] U.S. Cl. .................................................. 707/3; 707/101
[58] Field of Search .................................. 707/1–3, 100, 707/101, 200, 205

[56] References Cited

U.S. PATENT DOCUMENTS

| | | | |
|---|---|---|---|
| 4,945,475 | 7/1990 | Bruffey et al. | 707/1 |
| 5,291,583 | 3/1994 | Bapat | 395/705 |
| 5,295,261 | 3/1994 | Simonetti | 707/2 |
| 5,379,419 | 1/1995 | Heffernan et al. | 707/4 |
| 5,386,559 | 1/1995 | Eisenberg et al. | 707/201 |
| 5,404,518 | 4/1995 | Gilbertson et al. | 707/3 |
| 5,448,727 | 9/1995 | Annevelink | 707/101 |
| 5,467,471 | 11/1995 | Bader | 707/1 |
| 5,504,879 | 4/1996 | Eisenberg et al. | 707/100 |
| 5,511,186 | 4/1996 | Carhart et al. | 707/2 |
| 5,530,957 | 6/1996 | Koenig | 707/100 |
| 5,581,756 | 12/1996 | Nakabayashi | 707/2 |
| 5,592,661 | 1/1997 | Eisenberg et al. | 707/104 |
| 5,594,899 | 1/1997 | Knudsen et al. | 707/2 |
| 5,600,832 | 2/1997 | Eisenberg et al. | 707/203 |
| 5,644,740 | 7/1997 | Kiuchi | 345/357 |
| 5,675,784 | 10/1997 | Maxwell et al. | 707/100 |
| 5,708,806 | 1/1998 | DeRose et al. | 707/100 |
| 5,724,577 | 3/1998 | Exley et al. | 707/100 |
| 5,943,668 | 8/1999 | Malloy et al. | 707/3 |

FOREIGN PATENT DOCUMENTS

| | | | |
|---|---|---|---|
| 802491 | 4/1996 | European Pat. Off. | G06F 17/30 |
| 7271825 | 3/1994 | Japan | G06F 17/30 |
| 8235194 | 2/1995 | Japan | G06F 17/30 |
| 9605704 | 8/1994 | WIPO | G06F 17/30 |

OTHER PUBLICATIONS

IBM Technical Disclosure Bulletin, "Tree Traversal Techniques to Implement Enhanced Searches in Tree View," vol. 38, No. 02, Feb. 1995.

IBM Technical Disclosure Bulletin, "Relational Access Method Supporting Nested Data View," vol. 27, No. 6, Nov. 1984.

Herrin, E.H. II et al., "Schema and tuple treess: an intuitive structure for representing relational data," Computing Systems, vol. 9, No. 2, pp. 92–118, Spring 1996.

Kitakami, H. et al., "Building and search system for a large–scale DNA database," IEE Colloquium on 'Molecular Bioinformatics', Digest No. 1994/029, pp. 6/1–6/9, 1994.

(List continued on next page.)

*Primary Examiner*—Maria N. Von Buhr
*Attorney, Agent, or Firm*—Jeffrey S. LaBaw; David H. Judson

[57] ABSTRACT

A method of hierarchical LDAP searching in an LDAP directory service having a relational database management system (DBMS) as a backing store. According to the invention, entries in a naming hierarchy are mapped into first and second relational tables: a parent table, and a descendant table. These tables are used to "filter" lists of entries returned from a search to ensure that only entries within a given search scope are retained for evaluation. Thus, for example, the parent table is used during an LDAP one level search, and the descendant table is used during an LDAP subtree search. In either case, use of the parent or descendant table obviates recursive queries through the naming directory.

27 Claims, 5 Drawing Sheets

OTHER PUBLICATIONS

Waugh, T.C., et al., "The GEOVIEW design: a relational database approach to geographical data handling," Proceedings of the Second International Symposium on Spatial Data Handling, pp. 193–212, 1986.

Severance, C., "Could LDAP be the next killer DAP?" Computer, vol. 30, No. 8, pp. 88–89, Aug. 1997.

Gaffin, A. et al., "Intranets," Network World, vol. 4, No. 12, pp. 26–28, 30, 32, Feb. 1997.

Blum, D.J., "LDAP: helping directories get along," Business Communications Review, vol. 26, No. 12, pp. 37–40, Dec. 1996.

Jose, R.J.P. et al., "Providing multiple external views on directory user interfaces," Computer Networks and ISDN Systems, vol. 28, No. 4, pp. 543–550, Feb. 1996.

FIG. 1
(PRIOR ART)
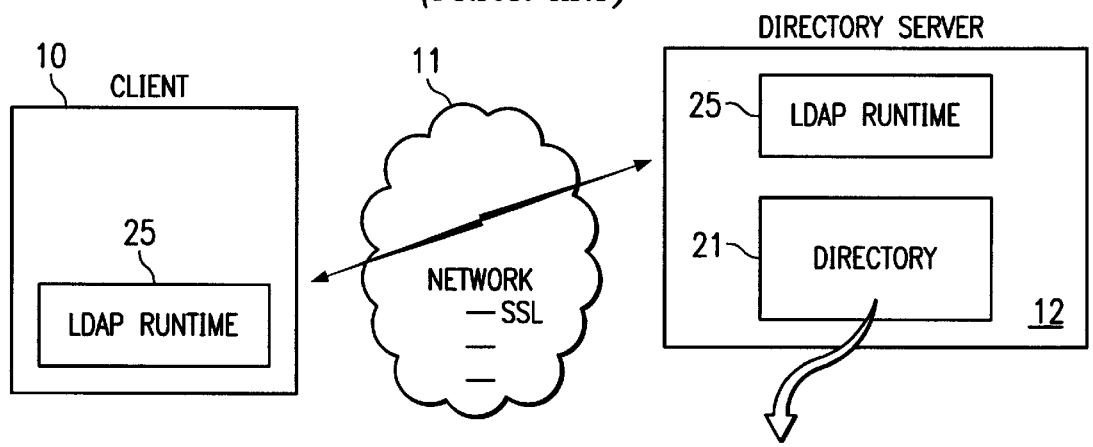
FIG. 2
(PRIOR ART)
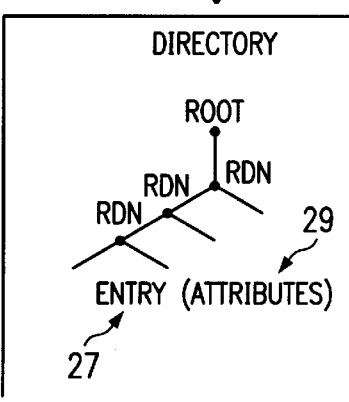
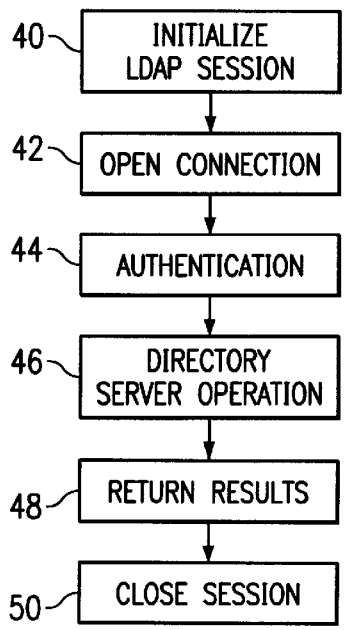
FIG. 3
(PRIOR ART)
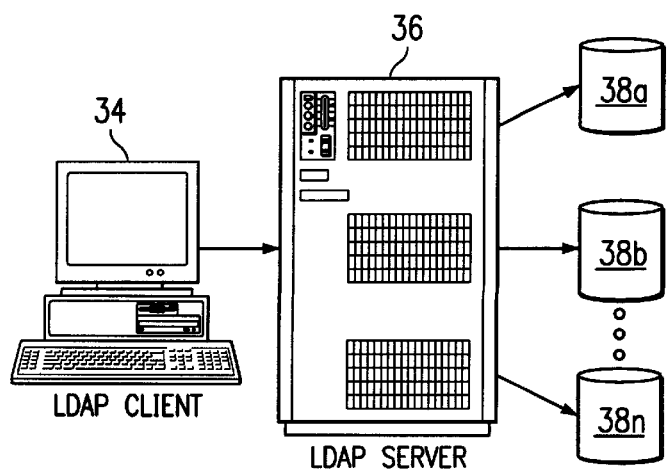
FIG. 4A

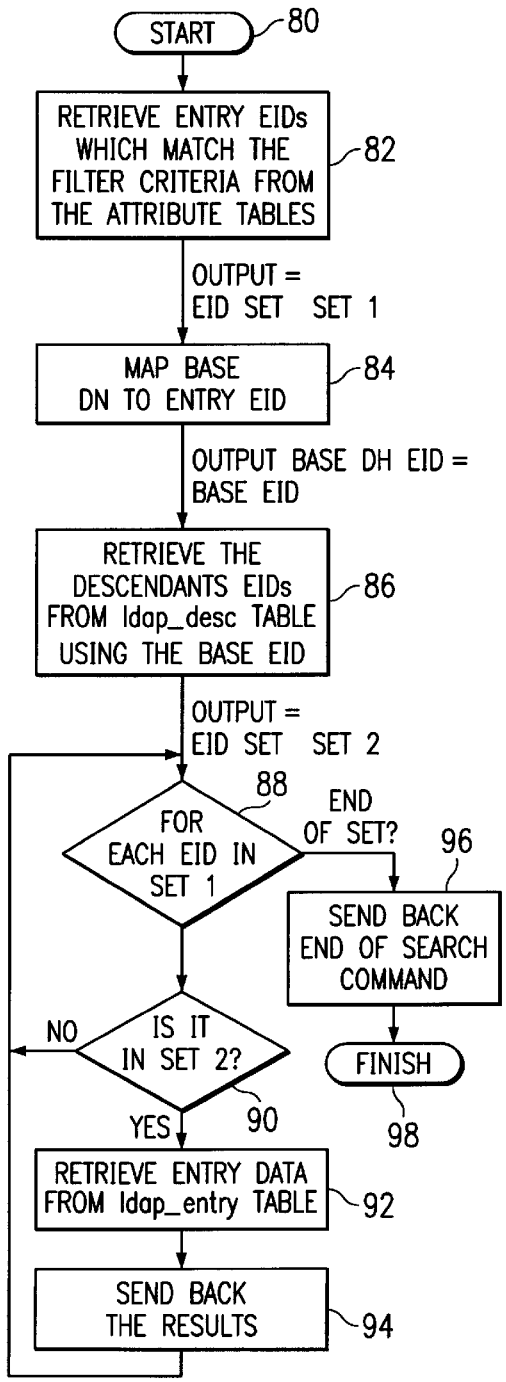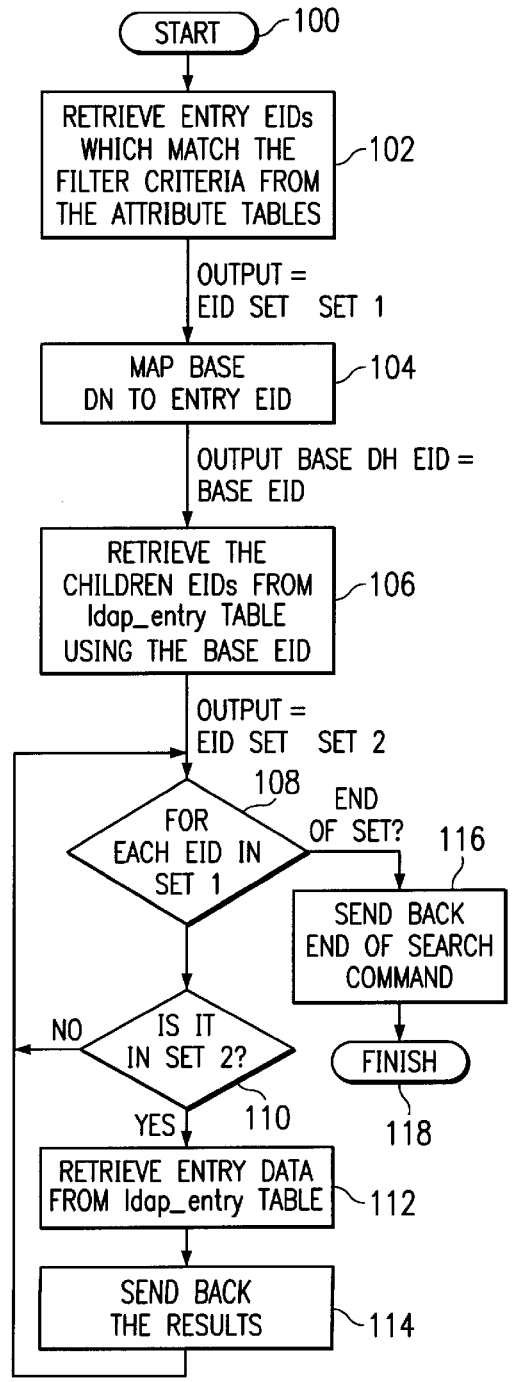
FIG. 9
FIG. 10

METHOD OF HIERARCHICAL LDAP SEARCHING WITH RELATIONAL TABLES

BACKGROUND OF THE INVENTION

1. Technical Field

This invention relates generally to providing directory services in a distributed computing environment.

2. Description of the Related Art

A directory service is the central point where network services, security services and applications can inform other entities in the network about their services, thus forming an integrated distributed computing environment. The current use of directory services may be classified into several categories. A "naming service" (e.g., DNS and DCE Cell Directory Service (CDS)) uses a directory as a source to locate an Internet host address or the location of a given server. A "user registry" (e.g., Novell NDS) stores information of all users in a system composed of a number of interconnected machines. The central repository of user information enables a system administrator to administer the distributed system as a single system image. Still another directory service is a "yellow pages" lookup provided by some e-mail clients (e.g., Netscape Communicator, Lotus Notes, Endora and the like).

With more and more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an Internet Engineering Task Force (IETF) open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model, in particular, is based on an "entry", which contains information about some object. Entries are typically organized in a specified tree structure, and each entry is composed of attributes.

LDAP provides the capability for directory information to be queried or updated. It offers a rich set of searching capabilities with which users can put together complex queries to get desired information from a backing store. As originally implemented (at the University of Michigan), LDAP used several freely available b-tree packages, such as the GNU dbm and Berkeley db44 packages. This reference implementation, however, does not provide a reliable and scaleable enterprise directory, in part, because of the use of a btree-based backing store.

One problem is that different vendors provide different mechanisms for the tree structure. For example, DB/2 provides the WITH clause in a Structured Query Language (SQL) SELECT statement to provide subtree transversal with arbitrary depth. Oracle, however, used CONNECT BY PRIOR and START WITH clauses in the SELECT statement to provide partial support for reachability and path enumeration. Other database management systems used different SQL semantics. In any case, all such mechanisms end up using recursive queries to handle hierarchical structures such LDAP entries. Recursive queries do not scale up well as the number of records in a relation table increases. Indeed, in a simple example involving 1000 LDAP entries, using DB/2 recursive queries, a simple SELECT takes more than several minutes to complete.

Thus, there is a need to provide a faster and more efficient method to support LDAP searches with relational tables without the overhead of recursive queries. This invention addresses and solves this problem.

BRIEF SUMMARY OF THE INVENTION

A primary object of this invention is to represent a directory service naming hierarchy with relational tables to facilitate fast and efficient directory service search capability.

Another primary object of this invention is to support hierarchical directory service searching with relational tables in a manner that obviates recursive queries, especially during one level and subtree traversal.

A further, more specific object of this invention is to provide hierarchical LDAP searches using relational tables in an LDAP directory service having a relational database management system (DBMS) as a backing store.

A more general object of this invention is to provide a reliable and scaleable enterprise directory solution.

These and other objects of the invention are provided by mapping entries in a naming hierarchy into first and second relational tables: a parent table, and a descendant table. The naming hierarchy has a plurality of entries each represented by a unique identifier (EID). A preferred implementation is LDAP using a DB/2 backing store.

In one preferred embodiment, the parent table is generated as follows. For each entry that is a parent of a child entry in the naming directory, the unique identifier of the parent entry is associated with the unique identifier of each entry that is a child of that parent entry. The parent table then comprises two (2) columns, a first column listing the parent entries' unique identifiers (in order), and a second column listing the associated child entries' unique identifiers. Thus, a given row of the parent table includes a parent entry and its associated child entry. The parent table summarizes parent-child relationships in the hierarchy.

The descendant table is preferably generated as follows. For each entry that is an ancestor of one or more descendent entries in the naming hierarchy, the unique identifier of the ancestor entry is associated with the unique identifier of each entry that is a descendent of that ancestor entry. The descendant table then comprises two (2) columns: a first column listing the ancestor entries unique identifiers (in order), and a second column listing the associated descendant entries' unique identifiers. Thus, a given row of the descendant table includes an ancestor entry and one of its associated descendant entries. The descendant table summarizes ancestor-descendant relationships in the hierarchy.

These tables are used to "filter" lists of entries returned from a search to ensure that only entries within a given search scope are retained for evaluation. Thus, for example, the parent table is used during an LDAP one level search, and the descendant table is used during an LDAP subtree search. In either case, use of the parent or descendant table obviates recursive queries through the naming directory.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a representative LDAP directory service implementation;

FIG. 2 is a simplified LDAP directory;

FIG. 3 is a flowchart of an LDAP directory session;

FIGS. 4A–4C show representative LDAP directory service implementations having relational database backing store;

FIG. 9 is a flowchart illustrating a subtree LDAP search according to the invention; and FIG. 10 is a flowchart illustrating a one level LDAP search according to the invention.

DETAILED DESCRIPTION OF THE PREFERRED EMBODIMENT

Figure 4B:
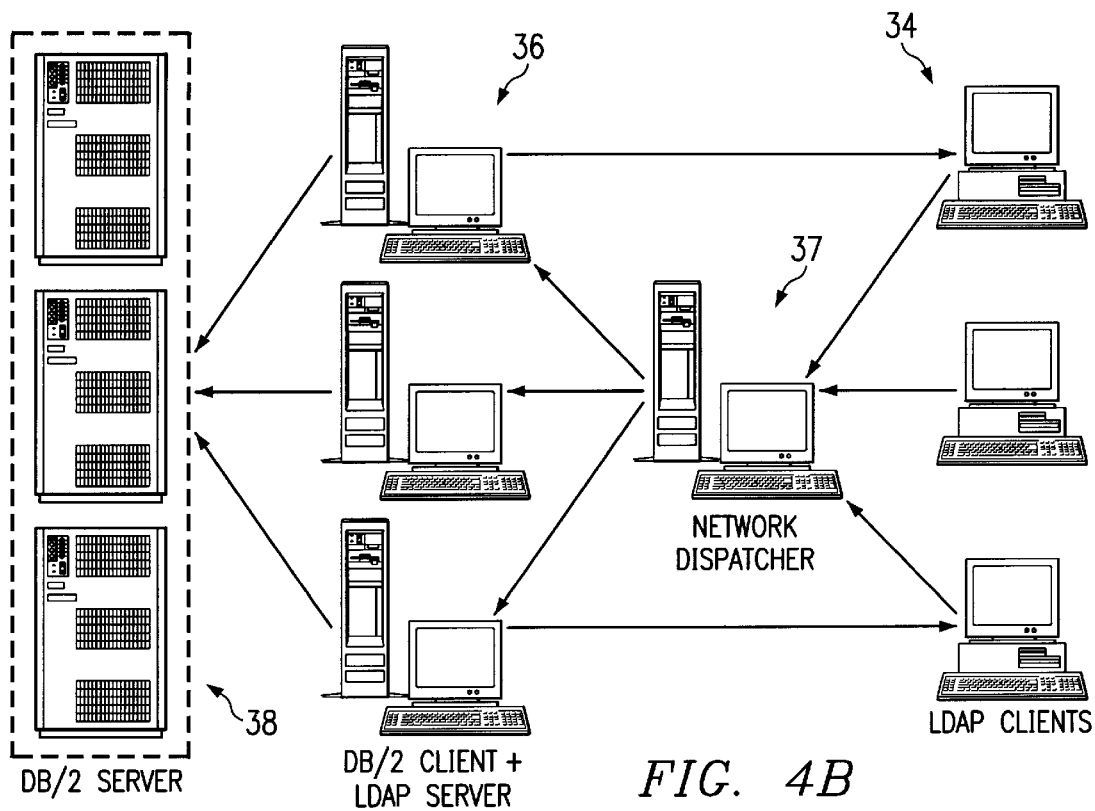

A block diagram of a representative LDAP directory service in which the present invention may be implemented is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection to an LDAP server 12 through network 11, sends requests and receives responses. LDAP server 12 supports a directory 21 as illustrated in a simplified form in FIG. 2. Each of the client and server machines further include a directory "runtime" component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII text, binary characters, and the like) and how these values are constrained during a particular directory operation.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

LDAP includes an application programming interface (API), as described in "The C LDAP Application Program Interface", IETF Task Force Working Draft, Jul. 29, 1997, which is incorporated herein by reference. An application on a given client machine uses the LDAP API to effect a directory service "session" according to the flowchart of FIG. 3. At step 40, an LDAP session with a default LDAP server is initialized. At step 42, an API function ldap_init() returns a handle to the client, and this handle allows multiple connections to be open at one time. At step 44, the client authenticates to the LDAP server using, for example, an API ldap_bind() function. At step 46, one or more LDAP operations are performed. For example, the API function ldap_search() may be used to perform a given directory search. At step 48, the LDAP server returns the results. The session is then closed at step 50 with the API ldap_unbind() function then being used to close the connection.

Figure 4C:
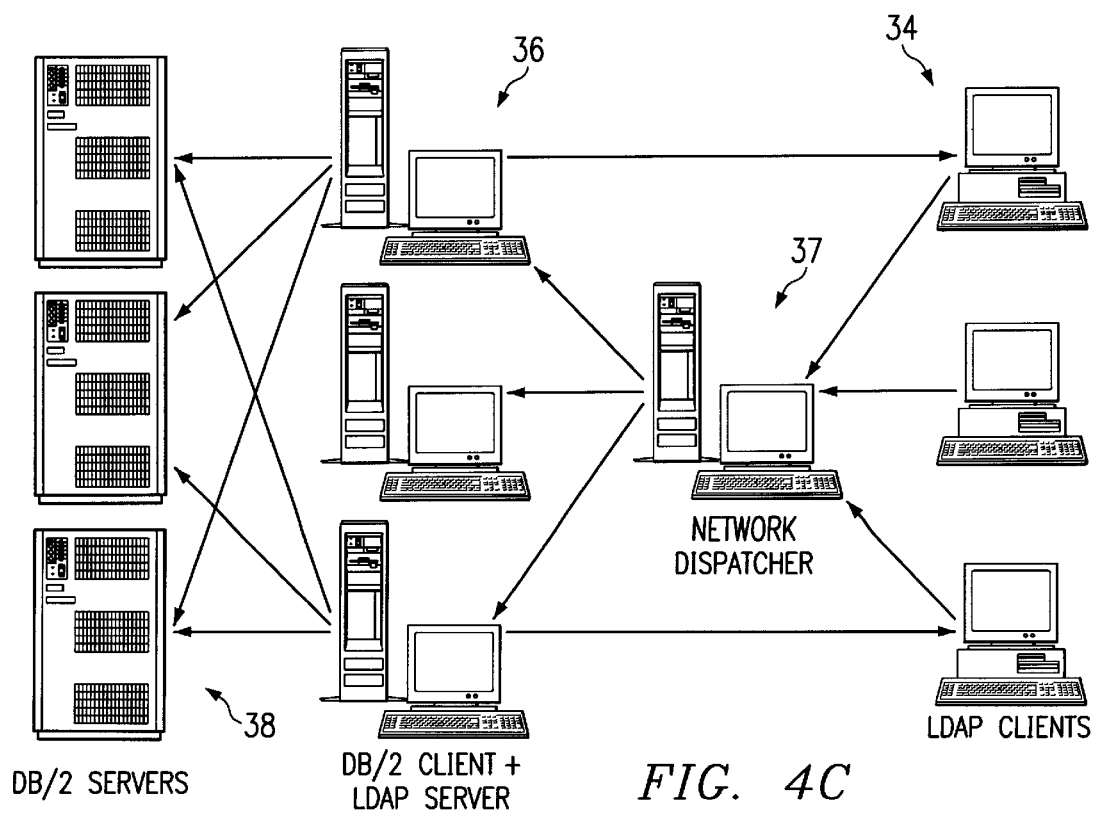

It may be desirable to store LDAP directory data in a backing store. FIGS. 4A–4C illustrates several representative LDAP directory service implementations that use a relational database management system (RDBMS) for this purpose. These systems merely illustrate possible LDAP directory services in which the present invention may be implemented. One of ordinary skill should appreciate, however, that the invention is not limited to an LDAP directory service provided with a DB/2 backing store. The principles of the present invention may be practiced in other types of directory services (e.g., X.500) and using other relational database management systems (e.g., Oracle, Sybase, Informix, and the like) as the backing store.

In FIG. 4A, an LDAP client 34 can connect to a number of networked databases 38a–38n through an LDAP server 36. The databases 38a–38n contain the directory information. However, from the user's perspective, the LDAP server 36 actually stores all the information without knowing the database 38 in which the data is actually located. With this configuration, the LDAP server 36 is freed from managing the physical data storage and is able to retrieve information from multiple database servers 38 which work together to form a huge data storage.

FIG. 4B illustrates a multiple client/multiple server LDAP/DB2 enterprise solution. In this environment, a DB/2 client preferably runs on each LDAP server 36. Each such DB/2 client can connect to any database server 38 containing directory information. The collection of database servers 38a–38n form a single directory system image, and one or more of the LDAP servers 36 can access such information. Because all the LDAP servers 36 see the same directory image, a network dispatcher 37 may be deployed to route requests among the LDAP servers 36.

FIG. 4C illustrates a multiple client/parallel super server configuration. In certain environments, where users need to store large amounts of information into the directory, this configuration automatically partitions the database into different machines 38. In addition, database queries are divided into smaller, independent tasks that can execute concurrently, which increases end user query response time. This configuration enables users to store up to terabytes of data into the database.

Figures 5, 6A, 6B:
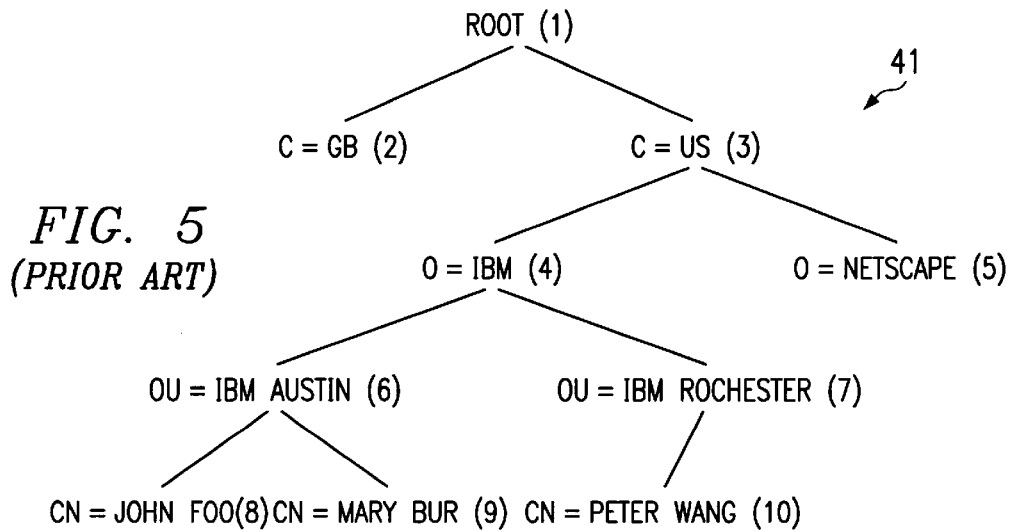
FIG. 5 is a representative LDAP naming hierarchy for illustrative purposes.
FIG. 6A is a parent table generated from the LDAP naming hierarchy of FIG. 5.
FIG. 6B is a descendant table generated from the LDAP naming hierarchy of FIG. 5.

FIG. 5 represents an illustrative LDAP directory service naming hierarchy 41. It is an object of the present invention to provide a scheme for mapping the naming hierarchy 41 into preferably a pair of so-called relational tables 43 and 45, as illustrated in FIGS. 6A–6B, respectively. For convenience, table 43 illustrated in FIG. 6A is a "parent-child" or so-called "parent" table for short, and table 45 illustrated in FIG. 6B is an "ancestor-descendant" or so-called "descendant" table for short. Mapping the naming hierarchy 41 into the first and second tables 43 and 45 provides the significant advantage of obviating recursive queries during the performance of certain LDAP searches.

The following discussion of the naming hierarchy in FIG. 5 and its associated relational tables in FIGS. 6A–6B is merely illustrative. As seen in FIG. 5, the LDAP naming hierarchy includes a number of entries or nodes, with each entry or node represented by a unique entry identifier (EID). Thus, for example, the root node has an EID=1. Root has two (2) children, entry GB ("Great Britain") having an EID=2, and entry US ("United States") having an EID=3. Child node US itself has two (2) children, O=IBM (with EID=4) and O=Netscape (with EID=5). The remainder of the naming directory includes several additional entries at further sublevels.

A particular entry thus may be a "parent" of one or more child entries. An entry is considered a "parent" if it is located in a next higher level in the hierarchy. Likewise, a particular entry may be an ancestor of one or more descendant entries across many different levels of the hierarchy. A parent-child entry pair will thus also represent an ancestor-descendant pair.

According to the invention, the parent table is created as follows. For each entry that is a parent of a child entry in the naming directory, the unique identifier of the parent entry (PEID) is associated with the unique identifier of each entry that is a child of that parent entry. For the naming directory of FIG. 5, this association creates the parent table illustrated in FIG. 6A. Thus, PEID 1 is associated with EID 2 and EID 3, PEID 3 is associated with EID 4 and EID 5, and so on. Each row of the parent table includes a PEID:EID pair.

The descendant table is created as follows. For each entry that is an ancestor of one or more descendent entries in the hierarchy, associating the unique identifier of the ancestor entry (AEID) with the unique identifier of each entry that is a descendent (DEID) of that ancestor entry. The AEID field is the unique identifier of an ancestor LDAP entry in the LDAP naming hierarchy. The DEID field is the unique identifier of the descendent LDAP entry. Thus, in the naming directory 41, AEID 1 has DEIDs 2–10, because each of entries 2–10 are also descendants of the root node. AEID 3 has DEIDs 4–10, AEID 4 has DEIDs 6–10, and so on. Each row in the descendant table thus includes AEID:DEID pair.

The invention thus implements two relations or tables in order to support LDAP search: parent/child and ancestor/descendants. In the parent table, the EID field is the unique identifier of an entry in the LDAP naming hierarchy. The PEID field is the unique identifier of the parent entry in the naming hierarchy. In the descendant table, the AEID field is the unique identifier of an ancestor LDAP entry in the LDAP naming hierarchy. The DEID field is the unique identifier of the descendent LDAP entry.

LDAP provides a number of known functions including query (search and compare), update, authentication and others. The search and compare operations are used to retrieve information from the database. For the search function, the criteria of the search is specified in a search filter. The search filter typically is a Boolean expression that consists of attribute name, attribute value and Boolean operations like AND, OR and NOT. Users can use the filter to perform complex search operations. The filter syntax is defined in RFC 1960 (RFC stands for Request For Comments, See http://www.cis.ohiostate.edu/hypertext/information/rfc.html).

In addition to the search filter, users can also specify where in the directory tree structure the search is to start. The starting point is called the base DN. The search can be applied to a single entry (a base level search), an entry's children (a one level search), or an entire subtree (a subtree search). Thus, the "scope" supported by an LDAP search are: base, one level and subtree. LDAP does not support search for arbitrary tree levels and path enumeration.

According to the invention, the relation tables model the relationship between the LDAP entries to facilitate one level and subtree searches without recursive queries. In both cases, the search begins by going into the database and using the LDAP filter criteria to retrieve a list of entries matching the filter criteria. If the search is a one level search, the parent table is then used to filter out EIDs that are outside the search scope (based on the starting point or base DN). Likewise, if the search is a subtree search, the descendant table is then used to filter out EIDs that are outside the search scope (again, based on the base DN). Generally, the tables are not required to be used in a base level search.

In a preferred embodiment, each LDAP attribute that can be searched by the user is mapped to an attribute relation that consists of two columns: EID and normalized attribute value. As described above, each LDAP entry is assigned a unique identifier (EID). Based on the attribute syntax, the attributes are converted (or normalized) so that the invention can apply Structured Query Language (SQL) queries to the attribute values. For example, if the attribute syntax is case insensitive (CIS), the attribute value will be converted to all upper case and stored in an attribute table. The attribute table is used mainly for search operations to find the entries that match the filter criteria. The actual entry data is preferably stored in an ldap_entry table, as will be described. Thus, the generated SQL queries use the attribute table to locate the entry EIDs that match the filter expression. Then, the EIDs are used to retrieve the entry data from the ldap_entry table.

Various routines are provided for manipulating entries and for searching using the relational tables described above. As described below, the ldap_entry table includes the parent table, and the descendant table is the ldap_desc table. These routines are now described generally.

Figures 7, 8:
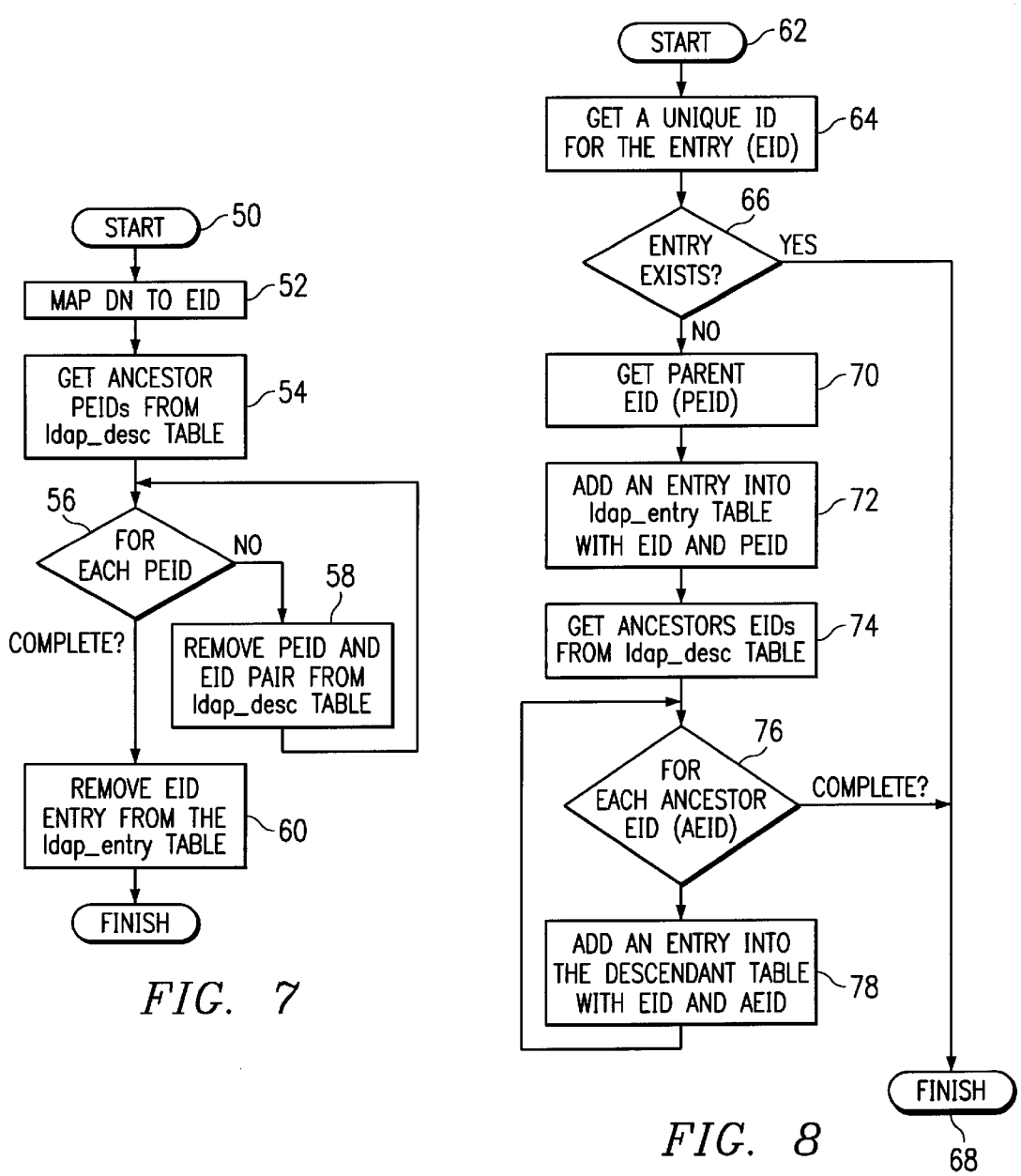
FIG. 7 is a flowchart illustrating a routine for deleting entries.
FIG. 8 is a flowchart illustrating a routine for adding entries.

FIG. 7 is a flowchart illustrating an ldap_delete (or delete) routine that removes entries from the database. It begins at step 50. At step 52, the routine maps the distinguished name (DN) to the entry identifier (EID). The routine then continues at step 54 by obtaining the ancestor (PEID's) from the ldap_desc table. For each PEID retrieved, the routine then performs a processing loop at step 56. In particular, the routine removes the PEID and EID pair from the descendant table (ldap_desc table), at step 58, and then cycles. When step 56 is complete (i.e. all PEIDs have been processed), the routine branches to step 60 to remove the EID entry from the ldap_entry table. This completes the processing.

FIG. 8 is a flowchart for a routine called ldap_add for adding entries to the database. Because the directory structure will be changed when entries are added into the database, the parent table (or ldap_entry) and the descendant table (ldap_desc) are updated to reflect the change. In other words, after all tables get created, the ldap_add routine is used to populate the tables with correct information.

The routine begins at step 62. At step 64, the routine retrieves the EID for the entry. A test is then performed at step 66 to determine whether the entry exists. If so, the routine branches to step 68 and exits. If, however, the output of the test at step 66 indicates that the entry does not exist, the routine continues at step 70 to obtain the parent identifier (PEID). At step 72, the routine adds an entry into the ldap_entry table, using the EID and its associated PEID. Then, the routine continues at step 74 to the ancestor EIDs (AEIDs) from the ldap_desc table. For each ancestor EID (AEID), the routine then performs a processing loop beginning at step 76. In particular, at step 78, the routine adds a row in the descendant table with the EID and its associated AEID. The routine then cycles back to step 76 until all AEIDs are processed, at which point the routine is finished.

FIG. 9 is a flowchart illustrating a subtree search.

As described above, this search preferably uses the descendant table to obviate recursive queries through a list of entries returned from an initial search query. The routine begins at step 80. At step 82, the routine retrieves entry EIDs which match the filter criteria from the attribute tables. Step 82 thus outputs a first set of EIDs that appear to match the search criteria. This set is then filtered using the descendant table as will be seen. In particular, at step 84, the routine maps the base DN to the entry EID. Step 84 outputs a base DN EID:base EID. The routine then continues at step 86 to retrieve the descendants EIDs from the descendant table (ldap_desc) using the base EID. The output of step 86 is a second set of EIDs. The routine then enters the processing loop 88 until all EIDs in the first set have been tested. In particular, the routine performs a test at step 90 to determine whether the EID under test is in the second set. If not, the routine cycles back to step 88 to get the next EID. If the outcome of the test at step 90 is positive, however, the routine retrieves the entry data from the ldap_entry table at step 92, and then sends back the results at step 94. The routine then cycles back to step 88 until complete. When all EIDs in the first set have been tested, the routine branches to step 96 to send back the end of search command. The routine then terminates at step 98.

FIG. 10 is a flowchart for a one level search. As described above, this search uses the parent table to obviate recursive queries through a list of entries returned from an initial search query. The routine begins at step 100. At step 102, the routine retrieves entry EIDs that match the filter criteria from the attribute tables. Step 102 outputs a first set of EIDs. At step 104, the routine maps the base DN to the entry EID. At step 106, the routine retrieves the children EIDs from the ldap_entry table using the base EID. This outputs a second set of EIDs. The routine then enters the processing loop 108 until all EIDs in the first set have been tested. In particular, the routine performs a test at step 110 to determine whether the EID under test is in the second set. If not, the routine cycles back to step 108 to get the next EID. If the outcome of the test at step 110 is positive, however, the routine retrieves the entry data from the ldap_entry table at step 112, and then sends back the results at step 114. The routine then cycles back to step 108 until complete. When all EIDs in the first set have been tested, the routine branches to step 116 to send back the end of search command. The routine then terminates at step 118.

It should be appreciated that the flowcharts described above are illustrative in nature and that the particular operations described above are normally effected using a single standard SQL query.

With the ldap_entry table (which includes the parent table) and the descendant table, the following SQL queries for LDAP search functions may then be generalized as follows:

Scenario 1: Base Search

Map the distinguished name to an unique id (UID);

```
SELECT EntryData
FROM ldap_entry
WHERE EID=<UID>
where <UID> is a constant for the select statement
```

Scenario 2: One Level Search

Map the distinguished name to an unique id (UID); the following query is independent of number of classes involved.

```
Scenario 2: One Level Search
    Map the distinguished name to an unique id (UID); the
following query is independent of number of classes
involved.
SELECT EntryData
FROM ldap_entry
WHERE EID IN (
select distinct EID FROM ldap_entry
WHERE PEID=<UID>
);
```

Scenario 3: Sub-tree Search

The following query is independent of the number of classes involved.

```
Single attribute (cn) case: ldap filter (cn=sshi)
    Map the subtree root DN to an unique ID (<UID>);
SELECT entry.EntryData,
FROM ldap_entry as entry
WHERE entry.EID in
(SELECT distinct ldap_entry.EID
FROM ldap_entry,ldap_desc
WHERE    (ldap_entry.EID=ldap_desc.DEID    AND
ldap_desc.AEID=<UID>)
AND ldap_entry.EID
IN (SELECT EID FROM SN WHERE SN = "sshi"))
```

The present invention provides significant advantages in an LDAP directory service having a relational database management system (DBMS) as a backing store. According to the invention, entries in a naming hierarchy are mapped into first and second relational tables: a parent table, and a descendant table. These tables are used to "filter" lists of entries returned from a search to ensure that only entries within a given search scope are retained for evaluation. Thus, for example, the parent table is used during an LDAP one level search, and the descendant table is used during an LDAP subtree search. In either case, use of the parent or descendant table obviates recursive queries through the naming directory.

Thus, with the parent and descendant tables, an LDAP/DB2 directory solution can handle all LDAP search functions. The inventive technique of mapping the naming hierarchy to the pair of relational tables has proven quite efficient when compared with other LDAP server implementations. The following are some measurement results for a 1 million entry database (in seconds): Simple select:

|  | Invention | Prior Art |
|---|---|---|
| sn = John | 0.490 | 0.730 |
| Wildcard select |  |  |
| sn = Zeno* | 0.400 | 0.500 |
| sn = Co*chio | 1.420 | 4.720 |
| Complex queries |  |  |
| \|(cn = Band) (sn = Chat) | 1.140 | 4.040 |

The performance results are achieved by avoiding the overhead of recursive queries through the naming hierarchy during one level and subtree LDAP searching. These results show that the solution works very well, especially considering its simplicity.

As noted above, the invention may be implemented in any hierarchical directory service in which a relational database management system (RDBMS) is used to provide a backing store function. The invention may also be implemented within a relational database management system being used as an add-on to a directory service.

One of the preferred embodiments of the control routines of this invention is as a set of instructions (computer program code) in a code module resident in the random access memory of a computer.

One of the main functions of LDAP/DB2 is to translate the LDAP filter expression into SQLs. The filter translator (rdbm_xlfilter.c) is used to generate the equivalent SQL expression corresponding to an LDAP filter that can be used in the WHERE clause of an SQL SELECT statement. The following specification describes in more detail (than that provided above) those relevant portions of the translation that are performed to generate the SQL expressions useful in the present invention. The LDAP filter translator also generates the list of SQL tables needed for the FROM clause. The SQL SELECT statements used by LDAP/DB2 search routines are in the following format:

Base Level Search:

```
SELECT entry.EntryData,
            creator,
            modifier,
            create_timestamp,
            modify_timestamp,
            Entry.EntryBlob,
            Entry.Entrysize
        from 1dap_entry as entry
        where entry.EID in (
            select distinct 1dap_entry.EID
            from <table list>
            where (1dap_entry.EID=<root dn id> )
<sql where expressions>)
```

One Level Search:
```
SELECT entry.EntryData,
            creator,
            modifier,
            create_timestamp,
            modify_timestamp,
            Entry.EntryBlob,
            Entry.Entrysize
        from 1dap_entry as entry
        where entry.EID in (
            select distinct 1dap_entry.EID
            from 1dap_entry, <table list>
```

-continued
```
            1dap_entry as pchild, <list of tables>
            where 1dap_entry.EID=pchild.EID
            AND pchild.PIED=<root dn id> <sql where expressions>)
```

Subtree Search:
```
    SELECT entry.EntryData,
                creator,
                modifier,
                create_timestamp,
                modify_timestamp,
                Entry.EntryBlob,
                Entry.Entrysize
            from 1dap_entry as entry
            where entry.EID in (
                select distinct 1dap_entry.EID
                from 1dap_entry, 1dap_desc, <table list>
                where
                    (LDAP_ENTRY.EID=1dap_desc.DEID
                    AND
1dap_desc.AEID=<root dn id>)
                    1dap_entry as pchild, <table list>
                    where 1dap_entry.EID=1dap_desc.EID
                    AND1dap_desc.AEID=%d<where expressions>),
```

The <table list> and <where-expression> are the two null terminated strings returned by the filter translator. The <root dn id> is the unique identifier of the root dn. The where clause should only be generated if <where-expression> is not the empty string and no errors where detected in the parsing the LDAP filter. Both Nested_Select and Nested_Join provide solutions for all LDAP filter expressions and performance results are comparable. Currently Nested_Select is the default.

The following is the detail explanation of the tables that are defined in LDAP/DB2. To make the table information more compact, the parent table is preferably combined with the ldap_entry table which contains the information about entries.

Entry Table

This table holds the information about a LDAP entry. This table is used for obtaining the EID of the entry and supporting LDAP_SCOPE_ONELEVEL and LDAP_SCOPE_BASE search scope. The parent table is preferably included in the Entry table since all the other attributes are dependent on EID.

EID—The unique identifier of the LDAP entry. This field is indexed.

PEID—The unique identifier of the parent LDAP entry in the naming hierarchy. For example, the LDAP entry with the name "ou=Information Division, ou=People, o=University of Michigan, c=US" is the parent of "cn=Barbara Jensen, ou=Information Division, ou=People, o=University of Michigan, c=US".

DN—The distinguished name of the entry.

DN TRUC—Truncate DN to 250 characters so that one can build indexes on this field.

EntryData—Entries are stored using a simple text format of the form "attribute:value" as in the U.M. reference implementation. Non-ASCII values or values that are too long to fit on a reasonable sized line are represented using a base 64 encoding. Giving an ID, the corresponding entry can be returned with a single SELECT statement.

EntrySize—The size of the entry. If the entry size if larger than 32k, entry data is stored in EntryBlob instead.
EntryBlob—Entry data is stored in this column if the entry size if larger than 32k.
Creator—The DN of the entry creator.
Modifier—The DN of the entry modifier.
modify_timestamp—Record the time when the entry was last modified.
create_timestamp—Record the time when the entry was created.

The following is the SQL command to create the entry table and the index.
CREATE TABLE 1dap_entry (
    EID integer NOT NULL,
    PEID integer,
    DN_TRUNC varchar (250),
    DN long varchar,
    CREATOR long varchar,
    MODIFIER long varcar,
    modify_timestamp timestamp,
    create_timestamp timestamp,
    EntryData long varchar
    ENTRYBLOB BLOB,
    ENTRYSIZE integer
);
EID: unique index (primary key)
DN_TRUNC: index
PEID: index
Functional dependency:
    EID->PEID, DN_TRUNC, DN, CREATOR, MODIFIER,
Modify_timestamp
    EID->create_timestamp
    EID->EntryData, EntrySize, EntryBlob
    DN->DN_TRUCN
Descendant table
The purpose of this table is to support the subtree search feature of LDAP. For each LDAP entry with an unique ID (AEID), this table contains the descendant entries unique identifiers (DEID). The columns in this table are:
AEID - The unique identifier of the ancestor LDAP entry. This entry is indexed.
DEID - The unique identifier of the descend LDAP entry. This entry is indexed.
The following is the SQL cominand to create the descendant table and the index.
CREATE TABLE 1dap_desc (
DEID integer,
AEID integer
);
AEID, DEID: index
Functional dependency:
    DEID -> AEID Attribute table:

One table per searchable attribute. Each LDAP entry is assigned an unique identifier (EID) by the backing store.
The columns for this table are:
- ♦ EID
- ♦ Attribute value
- ♦ Truncated attribute value. If the length of the column is longer than 250 bytes, a trucated column is created for indexing. In DB2, the maximum length for a indexed column is 255 bytes.

The SQL type of the attribute depends in the LDAP data type. Indexes can be created for attributes whose size are less than 255 bytes.
For example, for a surname attribute in the person class, the following is the SQL to create the sn table:
CREATE TABLE sn (
    EID integer NOT NULL -continued Attribute table:

sn varchar (100) NOT NULL);
EID: index
attribute or attribute_t: index
Functional dependency:
    EID->attribute

Having thus described our invention, what we claim as new and desire to secure by letters patent is set forth in the following claims.

What is claimed is:

1. A method of searching a directory organized as a naming hierarchy having a plurality of entries each represented by a unique identifier, comprising the steps of:

generating a relational table associating unique identifier pairs in the naming hierarchy having a given hierarchical relationship;

in response to a search query having a given filter criteria and search scope, returning a list of entries that satisfy the given filter criteria; and using the relational table to filter out entries in the list according to the given search scope.

2. The method as described in claim 1 wherein the relational table summarizes parent-child relationships in the naming hierarchy.

3. The method as described in claim 2 wherein the relational table is generated by:

for each entry that is a parent of a child entry in the naming hierarchy, associating the unique identifier of the parent entry with the unique identifier of each entry that is a child of that parent entry; and indexing each respective parent entry unique identifier together with "its respective" child entries unique identifiers in an ordered list.

4. The method as described in claim 3 wherein the search query is a one level search.

5. The method as described in claim 1 wherein the relational table summarizes ancestor-descendant relationships between the unique identifier pairs.

6. The method as described in claim 5 wherein the relational table is generated by:

for each entry that is an ancestor of one or more descendent entries in the hierarchy, associating the unique identifier of the ancestor entry with the unique identifier of each entry that is a descendent of that ancestor entry; and indexing the ancestor entries' unique identifiers together with their associated descendent entry unique identifiers in an ordered list.

7. The method as described in claim 6 wherein the search query is a subtree search.

8. The method as described in claim 1 wherein the directory is a client/server directory service having a backing store.

9. The method as described in claim 8 wherein the backing store includes a relational database management system.

10. A method of searching a directory organized as a naming hierarchy having a plurality of entries each represented by a unique identifier, comprising the steps of:

generating first and second relational tables associating unique identifier pairs in the naming hierarchy having first and second given relationships;

in response to a search query having a given filter criteria and search scope, returning a list of entries that satisfy the given filter criteria; and using at least one of the first and second relational tables to filter out entries in the list according to the given search scope to avoid recursive queries through the list of entries.

11. The method as described in claim 10 wherein the first relational table summarizes parent-child relationships in the naming hierarchy.

12. The method as described in claim 11 wherein the first relational table is generated by:

for each entry that is a parent of a child entry in the naming hierarchy, associating the unique identifier of the parent entry with the unique identifier of each entry that is a child of that parent entry; and indexing each respective parent entry unique identifier together with its respective child entries unique identifiers in an ordered list.

13. The method as described in claim 12 wherein the search query is a one level search.

14. The method as described in claim 10 wherein the second relational table summarizes ancestor-descendant relationships in the naming hierarchy.

15. The method as described in claim 14 wherein the second relational table is generated by:

for each entry that is an ancestor of one or more descendent entries in the hierarchy, associating the unique identifier of the ancestor entry with the unique identifier of each entry that is a descendent of that ancestor entry; and indexing the ancestor entries' unique identifiers together with their associated descendent entry unique identifiers in an ordered list.

16. The method as described in claim 15 wherein the search query is a subtree search.

17. The method as described in claim 10 wherein the directory is a client/server directory service having a backing store.

18. The method as described in claim 17 wherein the backing store includes a relational database management system.

19. A computer program product in a computer-readable media for use in a computer to search a directory organized as a naming hierarchy having a plurality of entries each represented by a unique identifier, the computer program product comprising:

means for generating first and second relational tables associating unique identifier pairs in the naming hierarchy having first and second given relationships;

means responsive to a search query having a given filter criteria and search scope for returning a list of entries that satisfy the given filter criteria; and means for using at least one of the first and second relational tables to filter out entries in the list according to the given search scope to avoid recursive queries through the list of entries.

20. The computer program product as described in claim 19 wherein the first relational table is a parent table generated by associating the unique identifier of each parent entry with the unique identifier of each entry that is a child of that parent entry.

21. The computer program product as described in claim 19 wherein the second relational table is a descendant table generated by associating the unique identifier of each ancestor entry with the unique identifier of each entry that is a descendant of that ancestor entry.

22. A directory service system, comprising:

a directory organized as a naming hierarchy having a plurality of entries each represented by a unique identifier;

a relational database management system having a backing store for storing directory data;

means for searching the directory, comprising:

means for generating first and second relational tables associating unique identifier pairs in the naming hierarchy having first and second given relationships;

means responsive to a search query having a given filter criteria and search scope for returning a list of entries that satisfy the given filter criteria; and means for using at least one of the first and second relational tables to filter out entries in the list according to the given search scope to avoid recursive queries through the list of entries.

23. The directory service system as described in claim 22 wherein the first relational table is a parent table generated by associating the unique identifier of each parent entry with the unique identifier of each entry that is a child of that parent entry.

24. The directory service system as described in claim 22 wherein the second relational table is a descendant table generated by associating the unique identifier of each ancestor entry with the unique identifier of each entry that is a descendant of that ancestor entry.

25. The method as described in claim 22 wherein the directory is a client/server directory service.

26. The directory service system as described in claim 22 wherein the relational database management system is DB/2.

27. In a directory service having a directory organized as a naming hierarchy, the hierarchy including a plurality of entries each represented by a unique identifier, the improvement comprising:

a relational database management system having a backing store for storing directory data;

means for searching the directory, comprising:

means for generating first and second relational tables associating unique identifier pairs in the naming hierarchy having first and second given relationships;

means responsive to a search query having a given filter criteria and search scope for returning a list of entries that satisfy the given filter criteria; and means for using at least one of the first and second relational tables to filter out entries in the list according to the given search scope to avoid recursive queries through the list of entries.

* * * * *